(12) United States Patent
Steinmüller et al.

(10) Patent No.: US 6,179,104 B1
(45) Date of Patent: Jan. 30, 2001

(54) SELF-WINDING CABLE REEL

(75) Inventors: Jörg Steinmüller, Meinerzhagen;
Günther Kleindopp, Herscheid;
Gerhard Büttner, Suhl, all of (DE)

(73) Assignee: Atlanta Kabel Steinmuller GmbH + Co. KG, Ludenschied (DE)

( * ) Notice: Under 35 U.S.C. 154(b), the term of this patent shall be extended for 0 days.

(21) Appl. No.: 09/325,097

(22) Filed: Jun. 3, 1999

(30) Foreign Application Priority Data

Jun. 16, 1998 (DE) .............................................. 198 26 661

(51) Int. Cl.[7] ................................................... H02G 11/02
(52) U.S. Cl. .................. 191/12.2 R; 191/12 R; 191/12.4; 242/80; 242/107.1
(58) Field of Search ................ 191/12 R, 12.2 R, 191/12.4; 242/80, 118.41, 107.1

(56) References Cited

U.S. PATENT DOCUMENTS

| | | | |
|---|---|---|---|
| 2,856,470 | * 10/1958 | Hyde | 191/12.2 |
| 3,208,121 | * 9/1965 | Price | 191/12.2 |
| 3,657,491 | * 4/1972 | Ryder et al. | 191/12.2 |
| 3,680,809 | * 8/1972 | Blackmer et al. | 242/118.6 |
| 5,261,514 | * 11/1993 | Evans | 191/12.2 |

* cited by examiner

*Primary Examiner*—Sherman Basinger
*Assistant Examiner*—Frantz Jules
(74) *Attorney, Agent, or Firm*—Edwin D. Schindler

(57) ABSTRACT

A self-winding cable reel having a base plate which receives the cable drum on a bearing spindle. The technical problem is a stable and concentrated construction of all the functional parts on a base plate and a contact arrangement comprising a small number of individual parts. A circumferential stub (39) of the cable drum (3) projects into a U-shaped channel of the base plate (1), said channel being formed by a second circumferential wall (19), a second annular wall (20) and a third circumferential wall (21), a chamber (6) of the base plate (1) adjoins a window (26) of the third circumferential wall (21) and receives a winding spring (8) fastened to the circumferential stub (39), the third circumferential wall (21) has at least one further window (28), through which a braking roller (11) reaches and bears against the inner surface of the circumferential stub (39), a central annular wall (22) of the base plate (1) receives contact rings (12, 13) and carries the bearing-spindle (2), and an annular wall (40) of the cable drum (3) carries sliding contacts (14, 15).

9 Claims, 6 Drawing Sheets

SELF-WINDING CABLE REEL

BACKGROUND OF THE INVENTION

1. FIELD OF THE INVENTION

The invention relates to a self-winding cable reel having a base plate which receives the cable drum on a bearing spindle.

2. DESCRIPTION OF THE PRIOR ART

A cable reel of this type is known from DE 40 25 409 C1. Here, the cable drum is of multipart design and the arrangement of the functional parts, such as winding spring, brake and slip rings, is complex.

SUMMARY OF THE INVENTION

The object of the invention is a stable and concentrated construction of all the functional parts on a base plate and a contact arrangement comprising a small number of individual parts.

This object is achieved in accordance with the invention in that a circumferential stub of the cable drum projects into a U-shaped channel of the base plate, said channel being formed by a second circumferential wall, a second annular wall and a third circumferential wall, in that a chamber of the base plate adjoins a window of the third circumferential wall and receives a winding spring fastened to the circumferential stub, in that the third circumferential wall has at least one further window, through which a braking roller reaches and bears against the inner surface of the circumferential stub, in that a central annular wall of the base plate receives contact rings and carries the bearing spindle and in that an annular wall of the cable drum carries sliding contacts.

The invention differs from the prior art in that all the functional parts are received by the base plate, the braking forces of the braking roller and the tensile forces of the winding spring being transmitted inside the base plate to a circumferential stub of the cable drum, so that only low moments of force occur in the operation of the cable reel. The arrangement of the contact rings with integrally formed plug pins or flat plugs on the base plate has the advantage that the contact rings can be easily exchanged if another type of connection is required, for example flat plugs of different thickness or made of different material.

Secure reception and retention of the winding spring is obtained in that the winding spring is fastened to a central spindle of the chamber.

Uniform loading of the slip rings is obtained in that the two sliding contacts are of the same design and in that the contact heads of the sliding contacts are approximately diametrically opposite each other.

A stable design of the brake and easy accessibility are achieved in that a radial guide for a braking lever is provided on the side of the base plate opposite the bearing spindle and in that the braking lever has slots oriented symmetrically with respect to the guide for the purpose of guiding a spindle of a braking roller. The brake can be mounted from the free side of the base plate and exchanged at any time. A quick exchange of a defective brake is thus possible.

Easy installation and dismounting of the brake facilitates the exchange thereof in that the braking lever can be pushed into the guide and the base plate in the axial direction and locked by guide fins and catch lugs.

The prestressing of the braking lever into the braking position is ensured in that a compression spring active in the radial direction is supported between the braking lever and a radially oriented stud of the base plate.

Firm holding and travel limitation for the centrifugal weights is achieved in that centrifugal weights guided in radial guides of a flange of the cable drum engage, with slots, over catch elements of the guides.

Simple and reliable strain relief is achieved in that clamping strain relief elements are provided inside the core of the cable drum.

BRIEF DESCRIPTION OF THE DRAWINGS

An exemplary embodiment is explained with reference to the drawings, in which.

DESCRIPTION OF THE PREFERRED EMBODIMENTS

Figure 1:
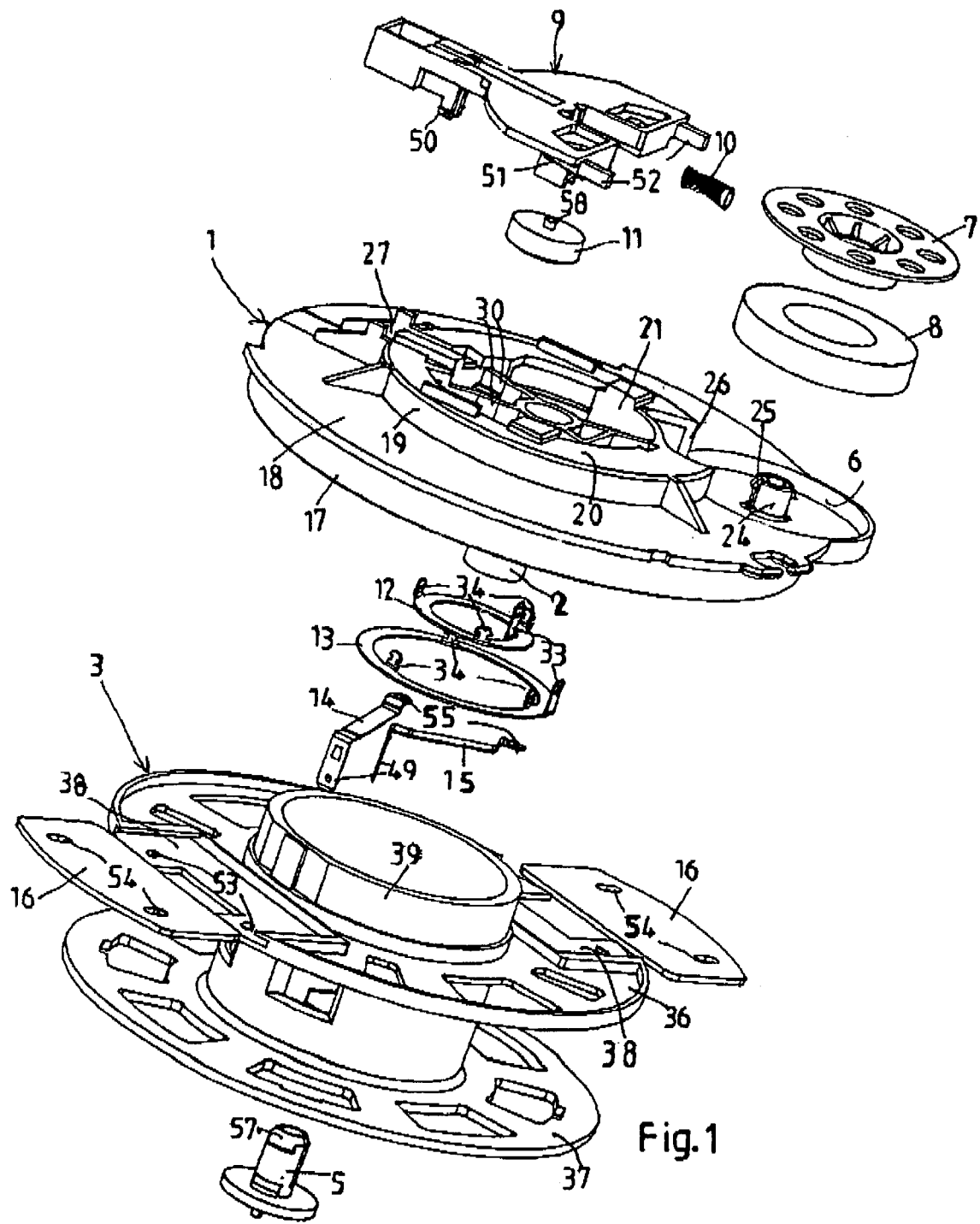
FIG. 1 shows an exploded view of the cable reel as seen from the side of the base plate.

The cable reel comprises the following main parts: a base plate 1 with a hollow bearing spindle 2, a cable drum 3 with a hub 4 seated on the bearing spindle 2, a bush shaped closure 5 with catch hook 57 for the purpose of retaining the cable drum 3 or its hub 4 on the bearing spindle 2, a roller 7 with a winding spring 8, said roller being received in a chamber 6 of the base plate 1, a braking lever 9 with a compression spring 10 and a braking roller 11, said braking lever being received in a radial guide 27 of the base plate 2, 1 as well as electrical functional parts such as two contact rings 12, 13 and two resilient sliding contacts 14, 15. The chamber 6 and the guide 27 are open on the side of the base plate 1 opposite the bearing spindle 2. Centrifugal weights 16 are guided and held in a flange 36 of the cable drum 3.

These main parts of the cable reel are explained in detail hereinbelow.

The base plate 1 is the load-bearing component of the cable reel and is installed in a housing (not shown) and locked or held in some other way therein. The base plate 1 comprises an outer, envelope-shaped first circumferential wall 17, a first annular wall 18 oriented in a radial plane, a further, envelope-shaped second circumferential wall 19, the two circumferential walls 17, 19 each adjoining the first annular wall 18 in opposite directions, a second annular wall 20 oriented in a radial plane, an inner, envelope-shaped third circumferential wall 21, which forms a U-shaped channel with the second annular wall 20 and the second circumferential wall 19, a third radial annular wall 22 and the central bearing spindle 2 for the hub 4 of the cable drum 3.

Situated on the side of the base plate 1 opposite the bearing spindle 2, in the region of the first annular wall 18, is the circular chamber 6, in the center of which is formed a hollow spindle 24 with catch lugs 25 at its end face. The wall of the chamber 6 contacts the second circumferential wall 19. In the contact region, a window 26 is formed in the second circumferential wall 19 and the wall of the chamber 6.

Figure 2:
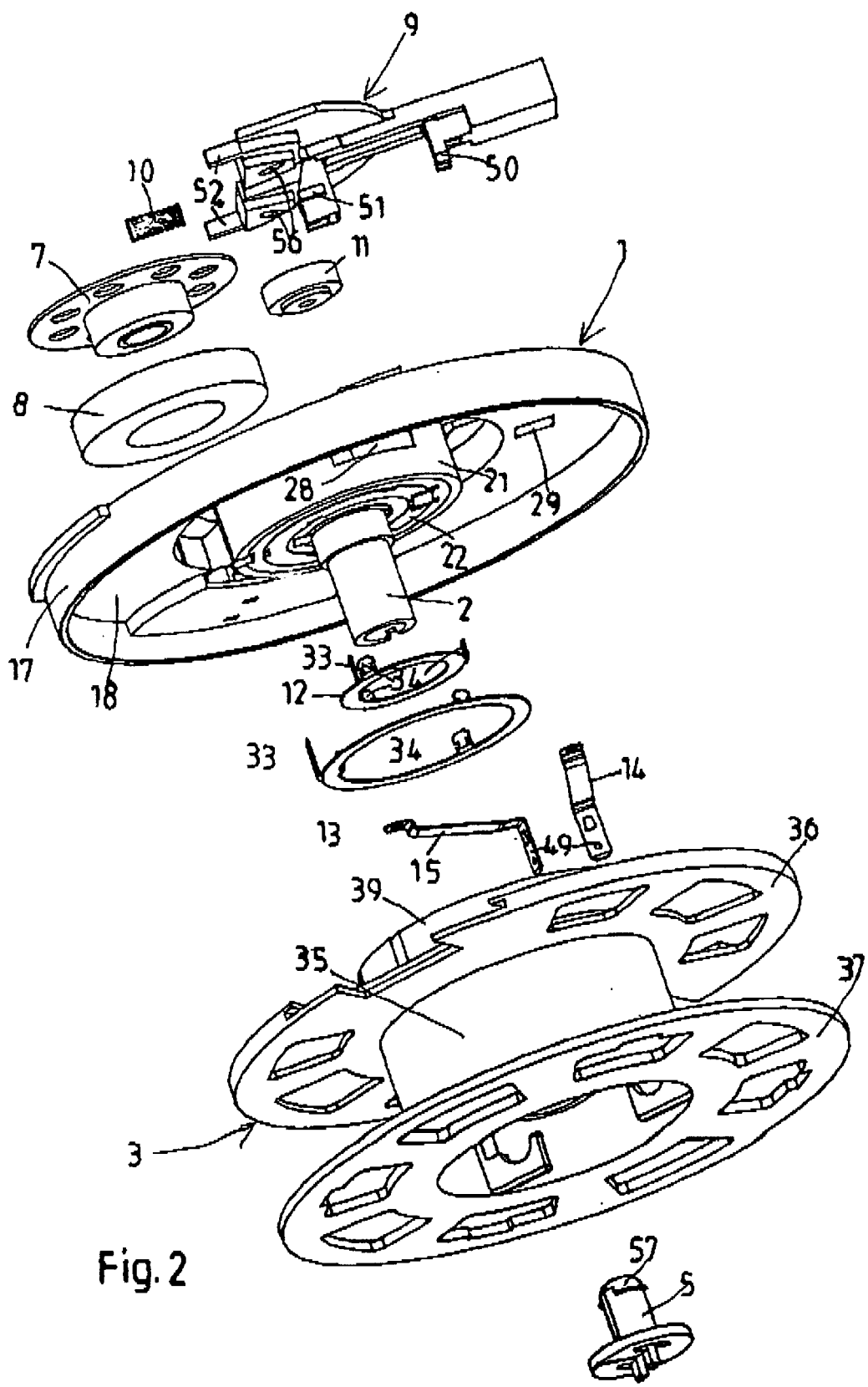
FIG. 2 shows an exploded view as seen from the side of the cable drum.
Figure 3:
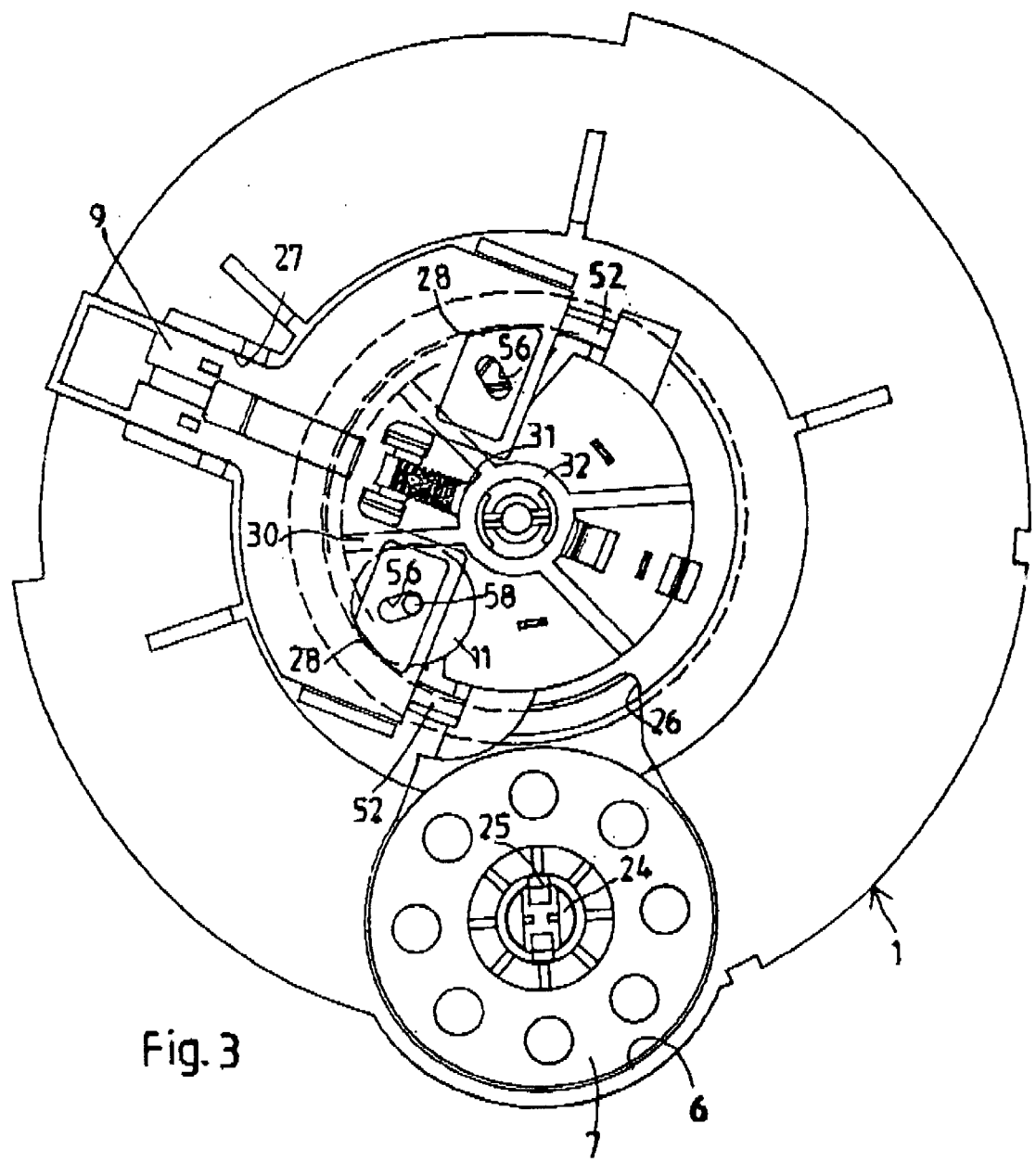
FIG. 3 shows a view of the base plate of the cable reel
Figure 4:
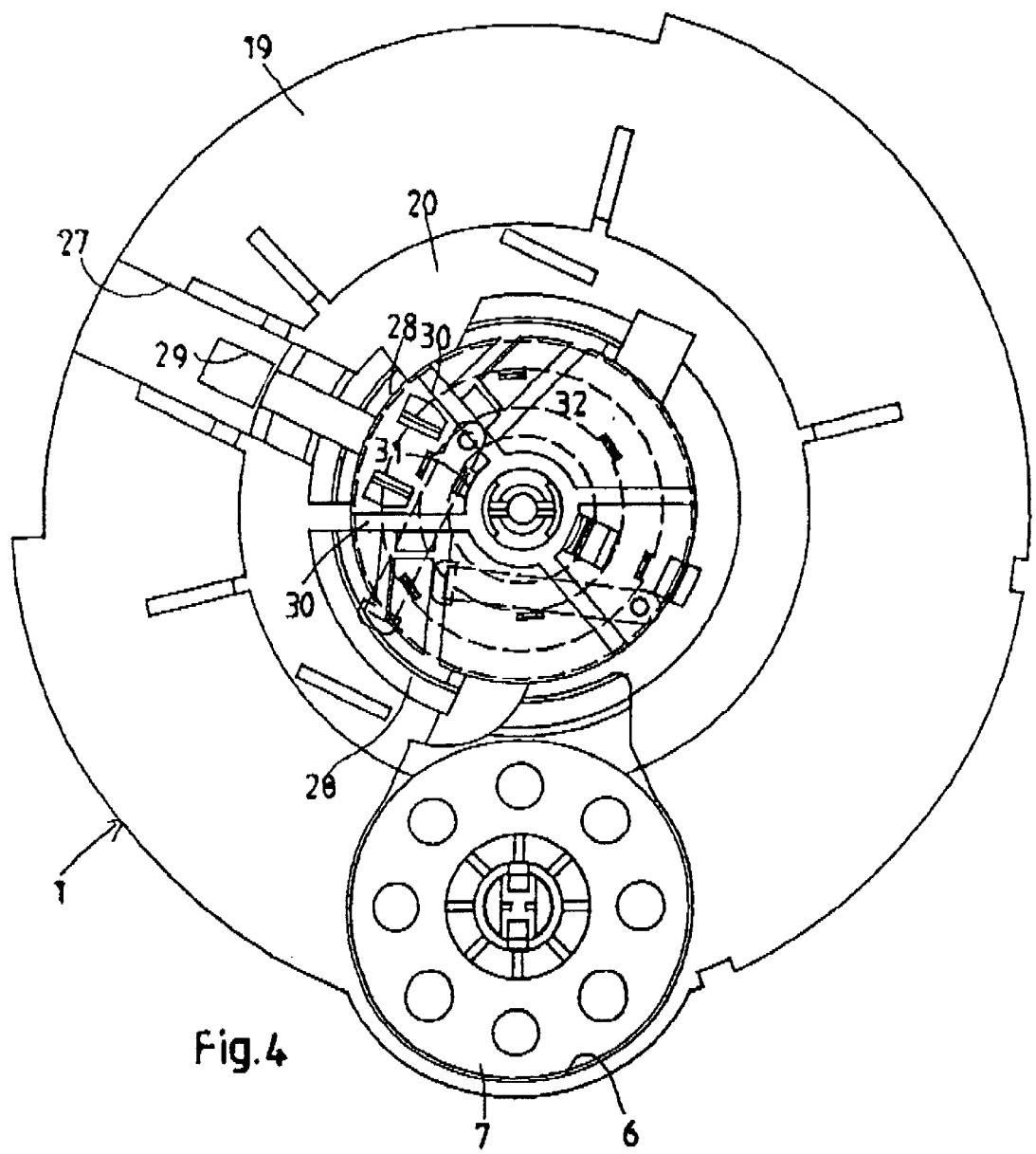
FIG. 4 shows a corresponding view with the braking lever removed.

Also situated on said side of the base plate 1, in the region of the first and second annular wall 18 and 20, is a radially oriented, profiled guide 27 for the braking lever 9, which engages, with guide fins 50, catch lugs 51 and pins 52, in slots 29 or undercuts and cutouts of the guide 27. Only one each of the guide fins 50 and catch lugs 51 can be seen, on one side of the braking lever 9. Formed on both sides of the guide 27, in the inner third circumferential wall 21, are windows 28 for the braking roller 11, of which one window 28 for one winding direction of the cable can be seen in FIG. 2. The other of these windows 28 is situated in the circumferential direction symmetrically with respect to the slot 29 of the guide 27. An approximately radially oriented wall 30 adjoins each end, facing the guide 27, of each window 28. A radial stud 31, aligned with the guide 27, for the purpose of receiving the compression spring 10 is integrally formed on an extension 32 of the bearing bush 2. The braking lever 9 is inserted into the guide 27 in the axial direction and locked therein by the guide fins 50 and catch lug 51 and secured and prestressed into the braking position by the compression spring 10. The braking lever is dismountable in the axial direction. It can thus be exchanged at any time if it has been damaged.

The two contact rings 12 and 13 are let into the third annular wall 22, said contact rings each carrying a plug pin or flat plug 33 and retaining tabs 34 which are inserted through passages of the third annular wall 22 and firmly hold the contact rings 12 and 13 and enable the electrical connection thereof. Contact rings 12, 13 made of different materials and of different dimensions, especially thickness dimensions, may be installed in a same base plate 1. A push-on sleeve of a connecting line (not shown) can be directly pushed onto the plug pins or flat plugs 33.

Two flanges 36, 37 are seated on a spool core 35 of the cable drum 3. Two pocket-shaped guides 38 for centrifugal weights 16 are formed in the flange 36. Catch elements 53 of each guide 38 engage in slots 54 of each centrifugal weight 16, thus allowing the centrifugal weights 16 to move only over the braking distance preset by the slots 54.

Adjoining the spool core 35 is a circumferential stub 39, to which on the one hand there is attached the winding spring 8, which is laid around the circumferential stub 39 when the cable is being drawn out, and the inner surface of which on the other hand serves as a braking surface for the braking roller 11.

Figure 5:
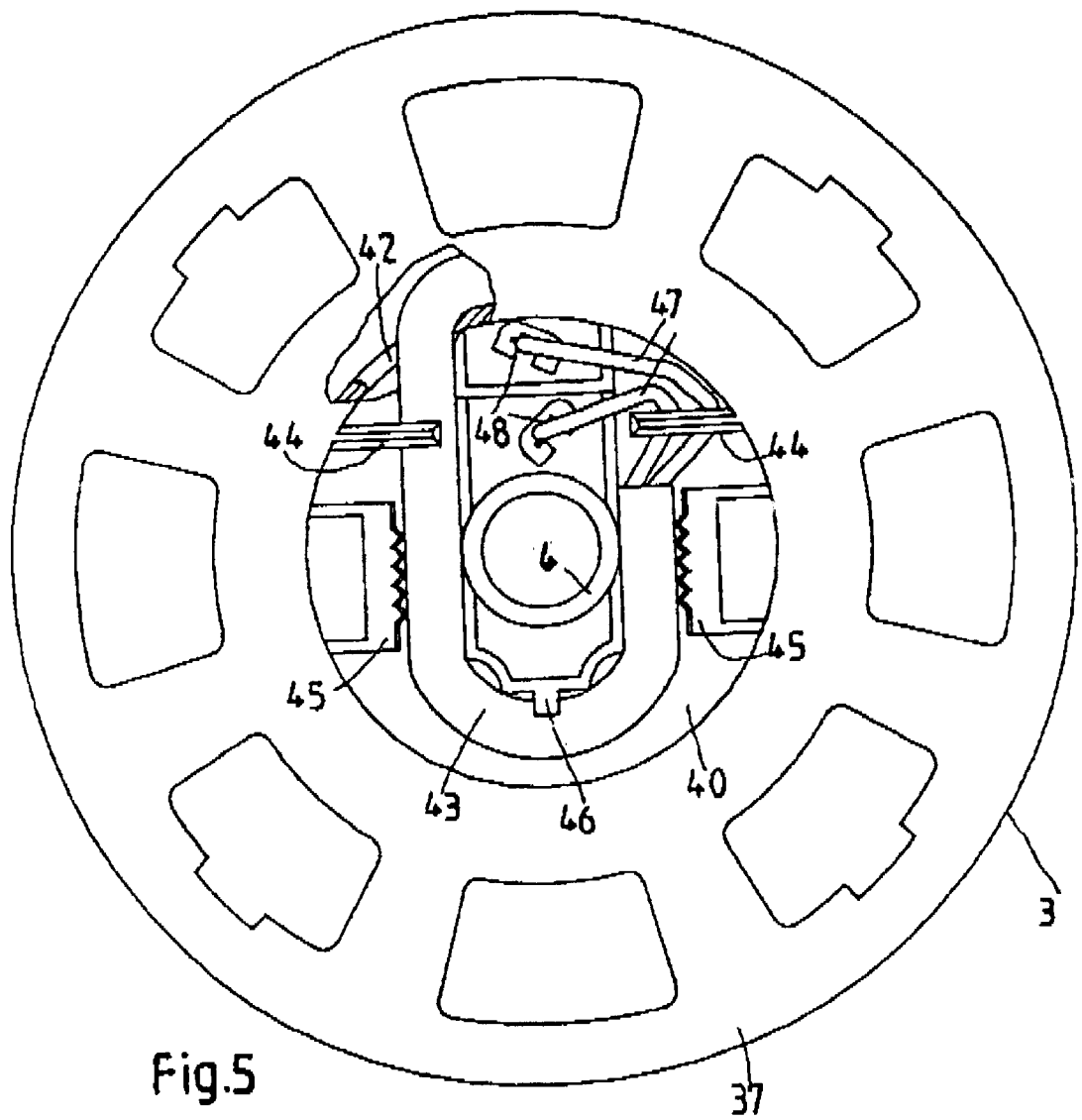
FIG. 5 shows an axial view of the cable drum and FIG. 6 shows an axial section through the cable reel.
Figure 6:
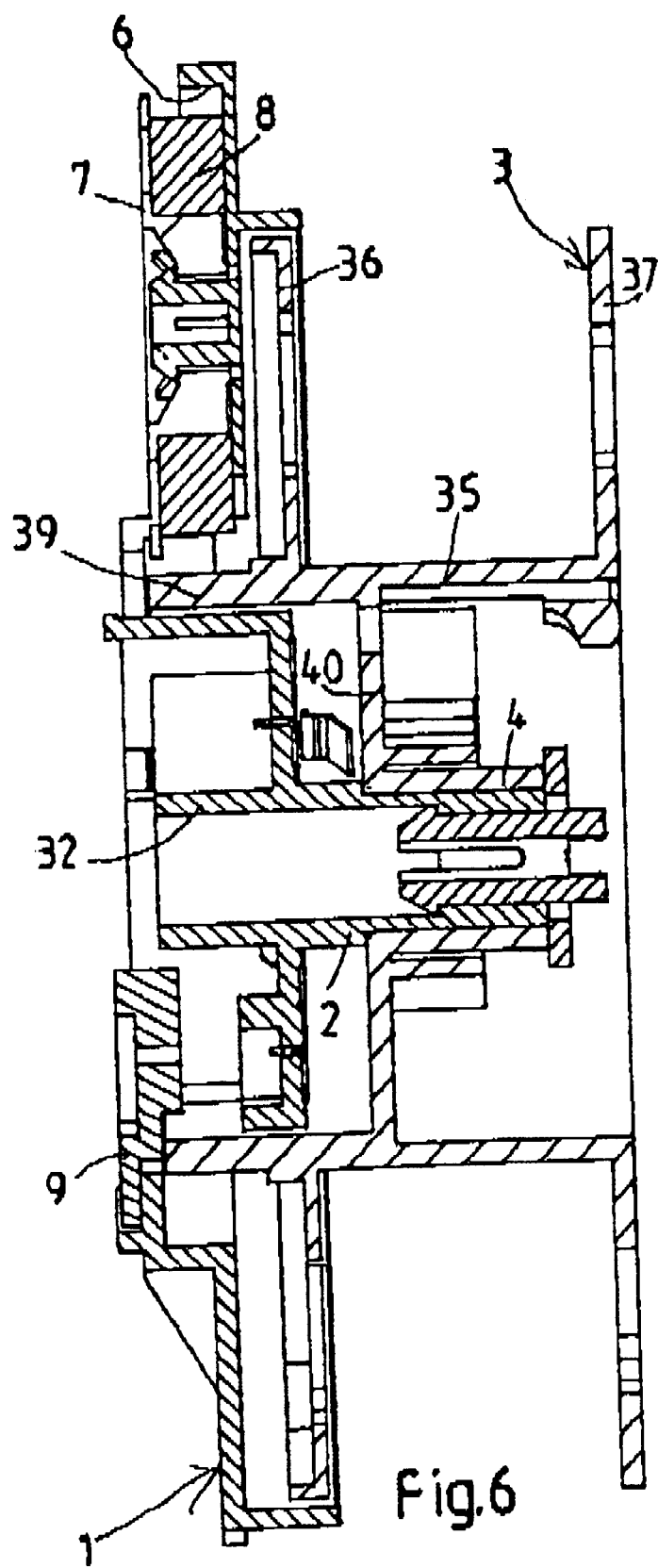

Inside the spool core 35, a radially oriented annular wall 40 carries the hub 4, which fits onto the bearing spindle 2. The strain relief device is also attached to the annular wall 40, as can be seen from the view of FIG. 5. Two passages 42 for opposite winding directions of a connecting cable 43 are provided in the spool core 35. The connecting cable 43 is clamped and held in position by retaining bars 44, clamping jaws 45 and lugs 46. The conductor ends 47 have push-on sleeves 48 which are pushed onto the plug pins or flat plugs 49 of the sliding contacts 14, 15. The sliding contacts 14, 15 are held in the annular wall 40 and bear, with contact heads 55, under prestress against the contact rings 12, 13. The sliding contacts 14, 15 are of the same design. The contact heads 55 are approximately diametrically opposite each other, thus resulting in a uniform contact pressure on the contact rings 12, 13. After these parts have been assembled, the closure 5 is pushed into the hollow bearing spindle 2 and locked by the catch hooks 57.

The braking lever 9 engages, with the guide fins 50, guide tabs 51 and guide pins 52, in slots 29 and other guides of the base plate 1. As a result, the braking lever 9 is guided in the radial direction. The compression spring 10 is supported on the stud 31 of the base plate 1 and on the braking lever 9 and prestresses the braking lever 9 into the braking position. In each slot 56 of the braking lever 9 there is guided a spindle 58 of the braking roller 11. The slots 56 are inclined relative to each other and relative to the walls 30. Although it is possible to draw out the connecting cable in the braking position, the cable drum 3 is braked by the braking roller 11 and the winding spring 8 is thus inactive. By actuating the braking lever 9 counter to the spring tension, the brake is released and the winding spring 8 can thus become active.

We claim the following:

1. A self-winding cable reel comprising a base plate which receives a cable drum on a bearing spindle, wherein a circumferential stub (3) of the cable drum (3) projects into a U-shaped channel of the base plate (1), said channel being formed by a second circumferential wall (19), a second annular wall and a third circumferential wall, wherein a chamber of the base plate adjoins a window of the third circumferential wall and receives a winding spring (8) fastened to the circumferential stub, wherein the third circumferential wall has at least one further window, throughwhich a braking roller reaches and bears against an inner surface of the circumferential stub, wherein a central annular wall of the base plate receives contact rings and carries the bearing spindle and wherein an annular wall of the cable drum carries sliding contacts.

2. A self-winding cable reel as claimed in claim 1, wherein the winding spring is fastened to a central spindle of the chamber.

3. A self-winding cable reel as claimed in claim 1, wherein the two sliding contacts are of the same design and wherein contact heads of the sliding contacts are approximately diametrically opposite each other.

4. A self-winding cable reel as claimed in claim 3, wherein the contact rings are exchangeable and have plug pins (33).

5. A self-winding cable reel as claimed in claim 1, wherein a radial guide for a braking lever is provided on a side of the base plate opposite the bearing spindle and wherein the braking lever has slots (56) oriented symmetrically with respect to the guide for the purpose of guiding a spindle of a braking roller.

6. A self-winding cable reel as claimed in claim 5, wherein the braking lever can be pushed into the guide and the base plate in the axial direction and locked by guide fins and catch lugs.

7. A self-winding cable reel as claimed in claim 5, wherein a compression spring active in the radial direction is supported between the braking lever and a radially oriented stud of the base plate.

8. A self-winding cable reel as claimed in claim 1, wherein centrifugal weights guided in radial guides of a flange of the cable drum engage, with slots, over catch elements of the guides.

9. A self-winding cable reel as claimed in claim 1, wherein clamping strain relief elements are provided inside the core of the cable drum.

* * * * *